Patented Nov. 17, 1953

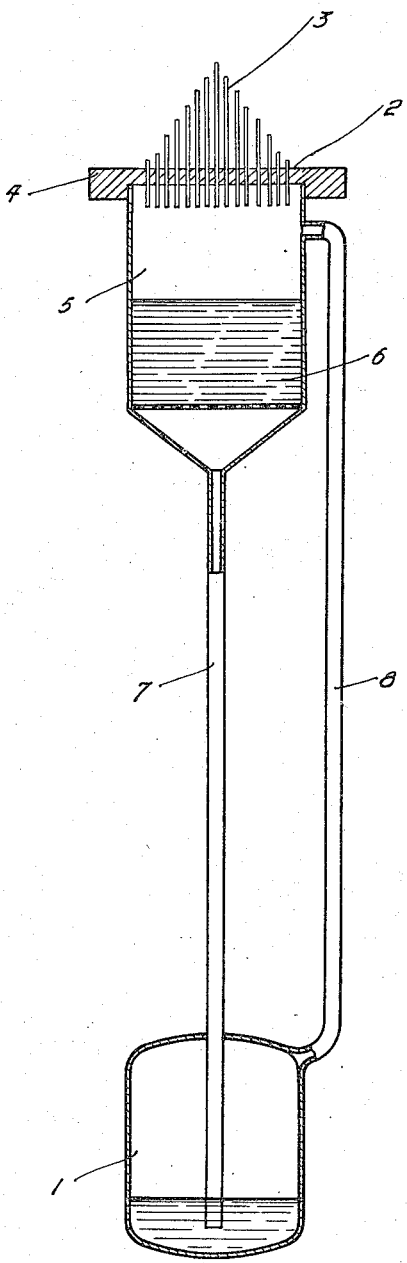

2,659,660

UNITED STATES PATENT OFFICE 2,659,660

METHOD AND APPARATUS FOR THE MANUFACTURE OF ALUMINA

André Sablé, Marseille, France, assignor to Societe d'Electro-Chimie d'Electro-Metallurgie et des Acieries Electriques d'Ugine, Paris, France, a corporation of France Application November 16, 1951, Serial No. 256,709

8 Claims. (Cl. 23—143)

It is known that alumina is industrially produced by the hydrolysis of a sodium aluminate solution, crystallization in the form of aluminum hydroxide, $Al(OH)_3$, or artificial gibbsite, and calcination of the $Al(OH)_3$ to produce alumina, $Al_2O_3$.

The crystals, born and grown in a soda solution, most often appear in the shape of agglomerates of monoclinic elementary crystals, more or less twinned and interlocked, and their multiple orientations may easily be revealed by a microscope examination in polarized light.

Owing to these conditions and to the fact, either of inter-crystalline occlusions, or of a surface physico-chemical affinity of alumina for $Na^+$ ions, or of the presence of a certain number of $ONa^-$ ions in the crystalline mesh, the soda percentage provided by aluminum hydroxide, $Al(OH)_3$, whether produced industrially or in the laboratory, is always much higher than that of other impurities.

Thus, whatever be their origins, aluminum hydrates now on the market have a constant ratio

corresponding to 0.3–0.6%.

Up to now, various methods have been suggested in order to lower the soda percentage of crystallized alumina, without modifying the physico-chemical condition of the hydrate, such as: exhaustion by pure water, by dilute acids or ammoniacal salts, which make it possible to obtain a hydrate still containing 0.2 to 0.3% $Na_2O$ for $Al_2O_3$.

Attempts have also been made in order to solubilize the soda which remains in the aluminum hydrate by transforming the alumina hydrate into anhydrous $Al_2O_3$ by calcination. Soda thus becomes accessible to an acid treatment, but the result therefrom is only partial and costly.

According to the present invention, it was discovered that changes in the physico-chemical condition in the crystalline structure of alumina could be obtained otherwise than by a brutal treatment such as calcination.

Owing to this discovery, the drawbacks of the calcination treatment can be avoided and the quality of the alumina resulting therefrom is decidedly improved.

It is known, that the usual monoclinic aluminum hydrate (gibbsite), is not stable above 180° C., but it was discovered that it can be decomposed under certain conditions of vapour pressure and composition of the liquid phase and can be re-crystallized under a less hydrated rhombohedral form which provides, under X rays, a spectrum identical with that of lepidocrocite.

The present invention has, for its object, a process for the preparation of aluminum hydroxide or alumina with a very low soda percentage, fundamentally consisting in treating monoclinic aluminum hydrate, for instance the usual Bayer hydrate, in an autoclave either with distilled water at a temperature above 180° C., or with water to which has been added a substance capable of liberating anions, which are capable of fixing $Na^+$ ions as they become free, such as ammoniacal salts of strong acids (for instance $H_2SO_4$, HCl), at a temperature preferably above 200° C., under a pressure of at least 15 kg./cm.², and in rapidly washing in distilled water, the rhombohedral hydrate thus obtained, preferably by means of an autoclave percolator, with steam under a pressure of at least 15 kg./cm.², comprising simultaneous autoclavation and washing.

Analysis shows that the aluminum hydrate crystallized in the rhombohedral form is obtained with a very low $Na_2O$ percentage, and the change of state in the solid phase may be effected in a very dilute aqueous medium.

The hydrate obtained according to the process of the present invention may be used, either directly for all possible uses due to its physical and chemical properties, or after calcination for the preparation of more or less anyhdrous aluminas, with low soda percentages and which are fit for the various uses requiring this property.

During the autoclavation process with distilled water, several antagonistic phenomena occur and the more or less low soda percentage is the consequence thereof.

1. The monoclinic hydrate is transformed into rhombohedral hydrate re-crystallizing under a less hydrated form, with the expulsion of $Na^+$ or $ONa^-$ ions.

2. The rhombohedral hydrate re-absorbs $Na^+$ or $ONa^-$ ions at the expense of the liquid phase. The first phenomenon is a function of time and temperature; in addition, it is enhanced by the presence of soda in the form of sodium aluminate in the liquid phase. The rearrangement of ions in the new crystalline network is thus facilitated. In the presence of ammoniacal salts opposing the formation of sodium aluminate, the transformation, for an equal time, requires a temperature 20° C. higher and it is less complete.

With distilled water and with hydrate free of soluble soda, the transformation is self-catalyzing, the first freed soda molecules speeding up the re-crystallisation of the whole.

The second phenomenon is a function of time, of temperature and of the soda concentration in the liquid phase. The re-absorption of $Na^+$ ions is thus lower as one gets closer to the minimum transformation time, for a given temperature, and when the amount of water for a unit mass of treated hydrate, in which the expelled $Na^+$ ions are diluted, is greater. With a minimum transformation time and a very large amount of water, the ideal conditions are reached for a given temperature.

It should be noted, further, that the soda which is re-absorbed during too long an operation or at too high a temperature, is partly soluble, and, consequently, capable of being partly eliminated by a long continued washing.

The practical optimum treatment duration is of the order of 1 to 4 hours, and depends on the following factors: initial content in soluble soda and granulemetry of the aluminium hydrate to be treated, water/soda or water: hydrate ratio. The consequence is that the indications given above should be considered only as orders of magnitude.

For a hydrate with given characteristics, the optimum treatment temperature and duration, should be determined empirically.

The rhombohedral hydrate obtained, which, as indicated above, is less hydrated than the initial monoclinic tri-hydrate substantially tends towards the general formula: $Al_2O_3 . 1.17 H_2O$ or $6 Al_2O_3 . 7 H_2O$.

According to the invention, the above described process may be worked, for example, by means of the apparatus schematically shown in the appended drawing. This apparatus is a kind of percolator which makes it possible, in particular to remove from contact with the aluminum hydroxide, as soon as it is freed, the soda which is solubilized during the recrystallization of the hydrate.

It comprises a boiler 1, in which water is boiled under pressure; a condenser 2, consisting of metal rods 3, passing through a cover 4, and the upper portions of which allow the dissipation in air of the heat corresponding to the steam condensation and the lower portions of which allow the steam condensation and the formation of drops which pour down; a tank 5 containing the aluminum hydrate 6 to be treated, which is thus heated by the steam arriving from boiler 1 through tube 8 and, further, passed through by the water which condenses on the lower portions of the metal rods 3 and flows, distributed in drops, over the whole surface of the hydrate by the points of the rods 3 arranged in staggered rows above said surface; a tube 7, providing the return, to boiler 1, of the condensed water which has gone through hydrate 6 and which contains the extracted soda to be eliminated.

This apparatus makes it possible to obtain in a reproducible and regular manner, in about four hours of treatment, at a temperature increasing very regularly from 180 to 220° C., a hydrate for which the fire loss is 16.7 to 17% and the ratio $Na_2O/Al_2O_3$ of which corresponds to 0.016% without any preliminary washing.

Various examples will be given hereinafter to illustrate the process of the invention and to show the results which may be obtained:

*Example 1*

One part, in weight, of Bayer hydrate (monoclinic aluminum hydrate), the particles of which have a mean diameter of 115 microns, previously washed up to a complete elimination of the soluble soda and containing, for 100 parts of $Al_2O_3$, 0.29 part of insoluble $Na_2O$, was treated for 3 hours, at a temperature of 195° C. and under a pressure of 15 kg./cm.$^2$ by 10 parts, in weight, of distilled water.

A product was obtained which, when removed from the autoclave and washed with distilled water, showed the following characteristics.

Fire loss: 17% ($Al_2O_3 . 1.17 H_2O$)
$Na_2O$ for 100 parts $Al_2O_3 = 0.016$

Proportion of eliminated water:

$$\frac{3-1.17}{3-1} = 0.915 \text{ i. e. } 91.5\%$$

Proportion of eliminated soda:

$$\frac{100(0.29-0.016)}{0.29} = 94.6\%$$

*Example 2*

The same hydrate, previously washed until a complete elimination of the soluble soda was subjected to the same treatment during one hour at 200° C. and under the same pressure.

The same characteristics were obtained.

*Example 3*

One part in weight of Bayer hydrate, identical with the above, was treated with 5 parts of distilled water containing 0.8% of $SO_4(NH_4)_2$, for 4 hours at 200° C. and under a pressure of 18 kg./cm.$^2$.

The product, removed from the autoclave, and washed with distilled water, has the following characteristics.

Fire loss 17.6% ($Al_2O_3 . 1.2 H_2O$)
$Na_2O$ for 100 parts $Al_2O_3 : 0.021$
Proportion of eliminated water:

$$\frac{3-1.2}{3-1} = 0.90 \text{ i. e. } 90\%$$

Proportion of eliminated soda:

$$100\left(\frac{0.29-0.021}{0.29}\right) = 92.8\%$$

*Example 4*

When the hydrate of Example 3 prepared as described, was treated for 1 hour at 200° C. and under the same pressure, the same characteristics resulted.

It was further noted, that during these operations, an amount of CaO of the order of 0.005 part for 100 parts of $Al_2O_3$ (i. e. about 10% of the initial amount), was eliminated from the hydrate crystals.

On the other hand, according to Examples 3 and 4, it was found that these crystals had fixed $SO_4^{--}$ ions in a proportion of 0.1 to 0.2% of the amount introduced.

Various modifications and changes may be made in the invention within the spirit and scope of the appended claims.

What I claim is:

1. A process for treating a soda-contaminated monoclinic alumina hydrate as obtained from Bayer process prior to calcination comprising heating the impure alumina above 180° C. with water under pressure to decompose the monoclinic crystals and recrystallize the alumina as a rhombohedral alumina and thereby to free soda as a result of the change in crystalline structure, separating the alumina thus obtained, and recovering the resulting alumina.

2. A process for treating soda-contaminated monoclinic alumina hydrate as obtained from the Bayer process prior to calcination to remove substantially the soda comprising heating the soda-contaminated alumina above 180° C. with water under a pressure of at least 15 kg./cm.$^2$ to decompose the monoclinic crystals and recrystallize the alumina in the form of a rhombohedral alumina hydrate and thereby to free soda as a result of the change in crystalline structure, separating the alumina thus obtained, and recovering the resulting alumina.

3. A process as claimed in claim 2 wherein the water which is heated with the soda-contaminated alumina contains soda.

4. A process as claimed in claim 2 wherein the water which is heated with the soda-contaminated alumina contains sodium aluminate.

5. A process as claimed in claim 2 wherein the wash for the recrystallized alumina contains an ammoniacal salt of a strong acid to fix sodium cations as they become free as a result of the change in crystalline structure.

6. A process for treating monoclinic alumina hydrate of the gibbsite type as obtained from the Bayer process prior to calcination to remove substantially a normally insoluble soda content comprising heating the contaminated alumina between 180° C. and 220° C. with water in a closed space and under a pressure of at least 15 kg./cm.$^2$ to decompose the monoclinic crystals, recrystallizing the alumina under substantially the same conditions in the form of a rhombohedral alumina hydrate and thereby freeing soda as a result of the change in crystalline structure, and water-washing the alumina thus obtained to remove the free soda.

7. A process for treating contaminated monoclinic alumina hydrate of the gibbsite type having an initial soda:alumina molar ratio of at least 0.3 per cent to remove substantially the balance of the soda comprising simultaneously decomposing the contaminated monoclinic alumina hydrate crystals at a temperature between 180° C. and 220° C. with distilled water in a closed space and under a pressure of at least 15 kg./cm.$^2$, recrystallizing the decomposed alumina crystals under substantially the same conditions to a rhombohedral alumina hydrate and thereby freeing soda as a result of the change in crystalline structure, washing the alumina thus obtained with distilled water to remove the free soda and recovering the resulting alumina.

8. In the process of converting a monoclinic alumina hydrate to a rhombohedral alumina hydrate by heating the former above 180° C. with water under pressure, the improvement comprising adding soda to the water to facilitate the arrangement of ions in the new crystalline structure.

ANDRÉ SABLÉ.

References Cited in the file of this patent
UNITED STATES PATENTS

| Number | Name | Date |
| --- | --- | --- |
| 382,505 | Bager | May 8, 1888 |
| 1,953,201 | Tosterud | Apr. 3, 1934 |
| 2,247,624 | Wall | July 1, 1941 |
| 2,378,155 | Newsome et al. | June 12, 1945 |
| 2,390,272 | Riesmeyer et al. | Dec. 4, 1945 |
| 2,405,275 | Stowe | Aug. 6, 1946 |
| 2,411,806 | Riesmeyer et al. | Nov. 26, 1946 |
| 2,411,807 | Riesmeyer | Nov. 26, 1946 |
| 2,478,675 | Tamele et al. | Aug. 9, 1949 |
| 2,610,110 | Eliasson | Sept. 9, 1952 |

OTHER REFERENCES

Dana—Textbook of Mineralogy, John Wiley and Sons, N. Y. (1932) Fourth Edition, page 508.

Mellor Comprehensive Treatise on Inorganic and Theoretical Chemistry, vol. 5, page 275, Longman, Green and Co. (1924) New York, N. Y.